United States Patent [19]

Engelmann

[11] 4,219,872
[45] Aug. 26, 1980

[54] POWER SUPPLY

[75] Inventor: Rudolph H. Engelmann, St. Paul, Minn.

[73] Assignees: James Von Bank, Robbinsdale; John W. Adams, Wayzata, both of Minn.; part interest to each

[21] Appl. No.: 968,019

[22] Filed: Dec. 11, 1978

[51] Int. Cl.$^2$ ............................................. H02M 7/06
[52] U.S. Cl. .................................... 363/126; 307/151; 320/1; 324/119
[58] Field of Search ............ 307/146, 150, 151, 317 R, 307/321; 320/1; 324/119; 363/44–48, 52–54, 84, 85, 94, 114, 116, 125–128

[56] References Cited

U.S. PATENT DOCUMENTS

| 2,876,411 | 3/1959 | Cann | 363/126 |
|---|---|---|---|
| 3,078,408 | 2/1963 | Colterjohn, Jr. | 320/1 |
| 3,292,073 | 12/1966 | Jones et al. | 307/321 X |
| 3,515,890 | 6/1970 | Kohashi et al. | 363/126 X |
| 4,109,306 | 8/1978 | Mason | 363/126 X |

Primary Examiner—William M. Shoop
Attorney, Agent, or Firm—Kinney, Lange, Braddock, Westman and Fairbairn

[57] ABSTRACT

A linear DC power supply provides high efficiency with substantially lower total capacitance than prior art linear DC power supplies. The power supply includes first and second input terminals, first and second output terminals, a center tap transformer, first and second capacitors, first and second charging circuits, and first and second discharging circuits. The center tap transformer has a primary connected to the first and second input terminals and has a secondary with first and second phase terminals and a center tap terminal which is connected to the second output terminal. The first charging circuit is connected to the secondary and the first capacitor to fully charge the first capacitor during a first portion of each cycle. Similarly, the second charging circuit is connected to the secondary for fully charging the second capacitor during a second portion of each cycle. The first discharging circuit connects the first capacitor to the first output terminal and permits the first capacitor to fully discharge during a third portion of each cycle. The second discharging circuit connects the second capacitor to the first output terminal and permits the second capacitor to fully discharge during a fourth portion of each cycle. The total capacitance of the power supply is significantly reduced by permitting the first and second capacitors to fully charge and discharge during each cycle. As a result, the differential voltage across the capacitors is much greater than in conventional linear power supplies, in which a DC voltage and a small ripple voltage are maintained across a filter capacitor.

24 Claims, 7 Drawing Figures

POWER SUPPLY

REFERENCE TO CO-PENDING APPLICATION

Reference is made to my co-pending application entitled "Voltage Regulator for Power Supply" which was filed on even date with this application Ser. No. 967,913.

BACKGROUND OF THE INVENTION

1. Field of the Invention

The present invention relates to power supplies which convert an input AC line voltage to a DC output voltage. In particular, the present invention is an improved linear power supply which has significantly lower capacitance and higher efficiency than prior art linear power supplies.

2. Description of Prior Art

The conventional form of linear DC power supply includes a step down transformer which has its primary winding connected to the input terminals of the power supply. The secondary of the transformer is connected to a rectifier circuit which rectifies the AC voltage induced in the secondary. The output of the rectifier circuit is a unidirectional charging current which is supplied to a filter capacitor. The size of the filter capacitor is selected so that the voltage across the filter capacitor is essentially a DC voltage with a small (for example one or two volts) ripple voltage riding on top of the DC voltage. For DC power supplies requiring high amperage output, the total filter capacitance becomes extremely large, which increases the cost and size of the power supply.

Non-linear or switching type power supplies have also been developed which exhibit high efficiencies. These switching power supplies, however, suffer from radio frequency (RF) and electromagnetic interference (EMI) problems due to the switching of semiconductor devices within the power supply circuitry during the operation of the power supply. As a result, switching type power supplies are undesirable in many applications.

SUMMARY OF THE INVENTION

The present invention is a linear type power supply having a high efficiency and substantially lower capacitance than prior art linear power supplies. The power supply of the present invention includes first and second input terminals which are connected to a primary of a center tap transformer. The center tap transformer has a secondary with a center tap terminal and first and second phase terminals. First and second capacitor means and first and second charging circuit means are connected to the secondary so that the first capacitor means is fully charged during a first portion of each cycle and the second capacitor means is fully charged during a second portion of each cycle. First and second discharging circuit means connect the first and second capacitor means, respectively, to the first output terminal. The first discharging circuit means permits the first capacitor means to fully discharge during a third portion of each cycle, while the second discharging circuit means permits the second capacitor means to fully discharge during a fourth portion of each cycle.

The substantial reduction in capacitance provided by the present invention results from the full charging and discharging of the first and second capacitor means. The differential voltage across each capacitor means during each cycle (which is inversely proportional to capacitance of the capacitor means) is substantially greater than the ripple voltage at the output terminals.

In one preferred embodiment, the first capacitor means and first charging means are connected between the first and second phase terminals, while the second capacitor means and the second charging circuit means are connected across the first and second phase terminals in the opposite direction so that charging of the first and second capacitor means occur during different portions of each cycle. The third and fourth portions of the cycle, during which the first and second capacitor means discharge, are preferably timed so that one of the capacitor means charges during a portion of the time that the other capacitor means is discharging. In other words, the first portion preferably occurs during part or all of the fourth portion, and the second portion preferably occurs during part or all of the third portion.

In another embodiment of the present invention, the first capacitor means and the first charging circuit means are connected between the first phase terminal and the center tap terminal, while the second capacitor means and the second charging circuit means are connected between the second phase terminal and the center tap terminal. In this embodiment, rectifier means are also connected between the first and second phase terminals and the first output terminals to permit a portion of the rectified voltage in the secondary to be provided directly to the first output terminal, supplemented by the outputs from the first and second capacitor means during the third and fourth portions of each cycle.

DETAILED DESCRIPTION OF PREFERRED EMBODIMENTS

Figure 1:
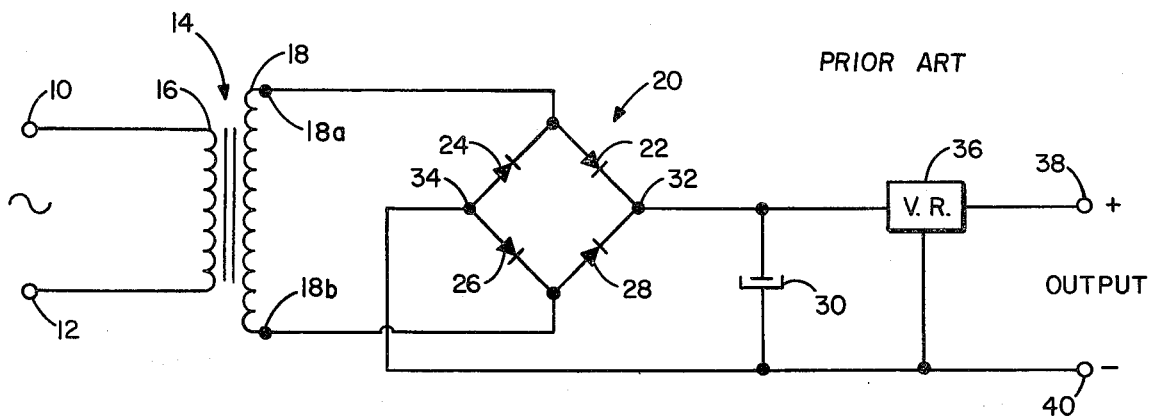
FIG. 1 is an electrical schematic diagram of a prior art linear power supply of the "bridge rectifier" type.
Figure 2:
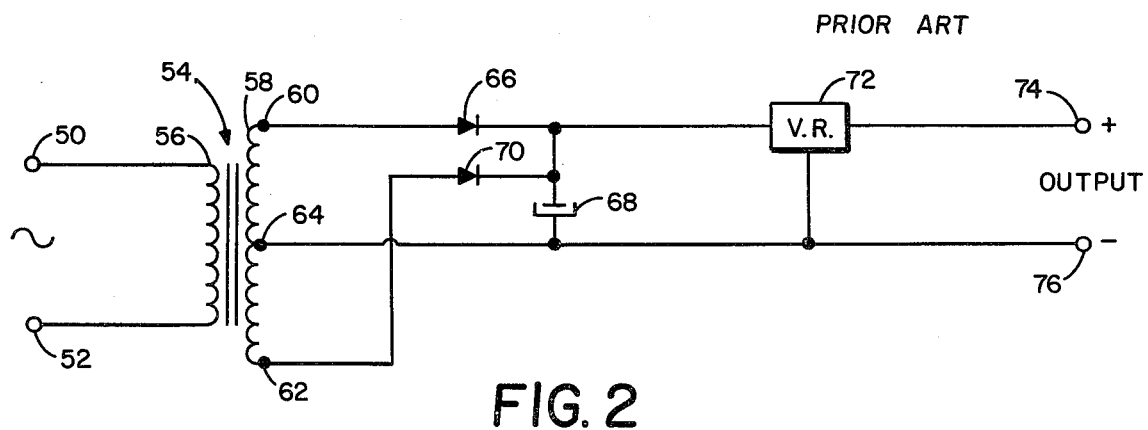
FIG. 2 is an electrical schematic diagram of a prior art linear DC power supply of the "full wave rectifier" type.

The Prior Art Power Supplies of FIGS. 1 and 2

FIG. 1 shows a prior art DC power supply of the "bridge rectifier" type. The power supply of FIG. 1 includes input terminals 10 and 12 which receive an AC voltage input. Step down transformer 14 has its primary winding 16 connected to input terminals 10 and 12. Secondary winding 18 has its two output terminals 18a and 18b connected to bridge rectifier circuit 20, which is formed by diodes 22, 24, 26, and 28. Filter capacitor 30 is connected across output terminals 32 and 34 of bridge rectifier circuit 20. Voltage regulator circuit 36 is connected across filter capacitor 30, and has its output terminal connected to positive output terminal 38. Negative output terminal 40 is connected to terminal 34 of bridge rectifier circuit 20, the negative terminal of filter capacitor 30, and the common or negative terminal of voltage regulator circuit 36.

The power supply of FIG. 1 converts the AC line voltage received at input terminals 10 and 12 to a regulated DC output voltage. AC input line voltage is stepped down by transformer 14 and is rectified by rectifier circuit 20 to produce unidirectional charging current to filter capacitor 30. During the portion of the first half cycle in which the voltage from terminal 18b to terminal 18a exceeds the voltage across capacitor 30 plus the forward bias voltage drops of diodes 22 and 26, current flows from terminal 18a through diode 22, capacitor 30, and diode 26 to terminal 18b. During a portion of the next half cycle, current flows through terminal 18b, diode 28, capacitor 30 and diode 24 to terminal 18a when the voltage from terminal 18a to terminal 18b exceeds the terminal voltage across capacitor 30 plus the forward bias voltage drops of diodes 24 and 28.

Voltage regulator circuit 36 is connected between filter capacitor 30 and output terminals 38 and 40 to regulate the DC output voltage which appears across terminals 38 and 40. In other words, voltage regulator circuit 36 maintains an essentially constant output voltage despite fluctuations in the DC capacitor voltage appearing across capacitor 30, so long as the capacitor voltage stays within the regulating limits of voltage regulator 36.

FIG. 2 shows another prior art power supply which is of the "full wave rectifier" type. The power supply includes input terminals 50 and 52, which receive the AC input voltage. Transformer 54 is a center tap type transformer having a primary 56 and secondary 58. Primary 56 is connected across input terminals 50 and 52. Secondary 58 has three terminals: a first phase terminal 60, a second phase terminal 62, and a center tap terminal 64. Diode 66 has its anode connected to first phase terminal 60 and its cathode connected to the positive terminal of filter capacitor 68. Similarly, diode 70 has its cathode connected to second phase terminal 62 and its cathode connected to the positive terminal of the filter capacitor 68. The negative terminal of filter capacitor 68 is connected to center tap terminal 64. Voltage regulator circuit 72 has an input terminal connected to the positive terminal of filter capacitor 68 and its common or negative terminal connected to the negative terminal filter capacitor 68. Output terminals 74 and 76 are connected to voltage regulator 72 so that the DC output voltage appearing across terminals 74 and 76 is controlled by voltage regulator 72.

The power supply of FIG. 2 operates in generally a similar manner to the bridge rectifier type power supply shown in FIG. 1. Transformer 54 steps down the AC input line voltage, and rectifiers 66 and 70 rectify the AC voltage derived from secondary 58 and supply unidirectional charging current to filter capacitor 68. During the positive half cycle of the first phase voltage (i.e. the voltage between terminals 60 and 64), charging current is supplied to filter capacitor 68 when the first phase voltage exceeds the capacitor voltage plus the forward bias voltage drop of diode 66. During the positive half cycle of the second phase voltage (i.e. the voltage between terminals 62 and 64) charging current is supplied to filter capacitor 68 when the second phase voltage exceeds the capacitor voltage plus the forward bias voltage drop of diode 70. Voltage regulator 72 maintains the DC output voltage across terminals 74 and 76 essentially constant regardless of fluctuations in the DC capacitor voltage across filter capacitor 68.

Both the bridge rectifier type power supply shown in FIG. 1 and the full wave rectifier type power supply shown in FIG. 2 have significant disadvantages. In particular, in both power supplies the capacitance of the filter capacitor (30 or 68) is extremely high. The capacitance of the filter capacitor is determined by the formula $dVC/i = t$, where dV is the differential voltage across the capacitor during the cycle, C is the capacitance of the capacitor, i is the load current supplied by the power supply, and t is the time that the capacitor must maintain the voltage above a predetermined minimum value.

For the power supplies of FIGS. 1 and 2 which operate with an input line voltage having a frequency of 60 Hz, the time that the filter capacitor has to maintain the voltage of the minimum is approximately 8 milliseconds (i.e. t=8 milliseconds). The ripple voltage of the power supply, which is the variation in voltage on the filter capacitor, is typically in the range of about 1 volt, so that dV equals 1 volt. For a one amp load current, the value of capacitance must be 8,000 microfarads. For higher load currents, the capacitance is even higher. For example, for a load current of 50 amps with dV remaining constant, the filter capacitance must be 400,000 microfarads.

In addition to the large capacitances required with the prior art linear supplies, the prior art power supplies require relatively large transformers. This is because in a conventional power supply like those shown in FIGS. 1 and 2, conduction of charging current to the filter capacitor occurs during only a very short period in each cycle. This is the time when the voltage in the secondary exceeds the filter capacitor voltage plus one or more forward bias diode drops. Before that time, the rectifier diodes are reverse biased and no conduction of charging current to the filter capacitor occurs. As a result, all of the charging current must be supplied during a relatively short time, and the current flow during that time is very high. The transformer of the power supply must be selected to accommodate the high surge currents required for charging in a short time period.

Figure 3:
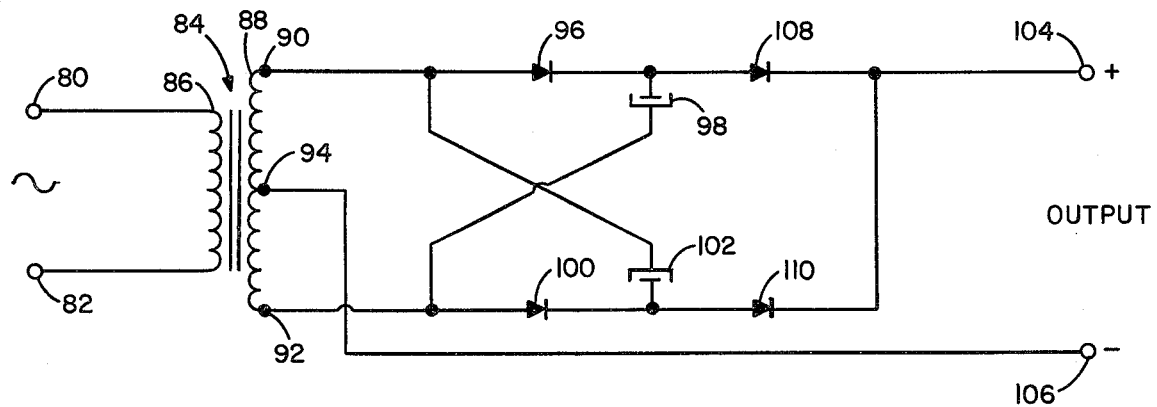
FIGS. 3-7 are electrical schematic diagrams of preferred embodiments of the power supplies of the present invention.

The Split Bridge Power Supply of FIG. 3

The power supply of the present invention achieves substantially lower capacitance values and also reduces the transformer requirements in comparison to the prior art linear power supplies. Basically, the present invention achieves lower capacitance and lower transformer requirements by fully charging and discharging capacitors during each cycle. In this manner, the value of differential voltage dV is substantially the entire peak to peak voltage appearing in the secondary of the transformer. Because capacitance is inversely proporational to dV, the increased value of dV results in substantially decreased capacitance values needed to provide the same load current for the same time.

FIG. 3 is a schematic diagram of one embodiment of the power supply of the present invention, which may be termed a "split bridge" power supply. The power supply of FIG. 3 includes input terminals 80 and 82, which receive input AC line voltage. Transformer 84 has its primary 86 connected to input terminals 80 and 82. Secondary 88 has three terminals: first phase terminal 90, second phase terminal 92, and center tap terminal 94.

Connected between first phase terminal 90 and second phase terminal 92 are first diode 96 and first capacitor 98. The anode of first diode 96 is connected to first phase terminal 90, and the cathode of first diode 96 is connected to the positive terminal of first capacitor 98. The negative terminal of first capacitor 98 is connected to second phase terminal 92.

Also connected between terminals 90 and 92 are second diode 100 and second capacitor 102. The anode of second diode 100 is connected to second phase terminal 92, while the cathode of second diode 100 is connected to the positive terminal of second capacitor 102. The negative terminal of second capacitor 102 is connected to first phase terminal 90.

The power supply of FIG. 3 includes positive output terminal 104 and negative output terminal 106. The positive terminal of first capacitor 98 is connected through third diode 108 to positive terminal 104, with the anode of third diode 108 connected to the positive terminal of first capacitor 98 and the cathode of third diode 108 connected to positive output terminal 104. Similarly, fourth diode 110 connects the positive terminal of second capacitor 102 with positive output terminal 104. The anode of fourth diode 110 is connected to the positive terminal of second capacitor 102 while the cathode of fourth diode 110 is connected to positive terminal 104. Negative output terminal 106 is connected to center tap terminal 94 of secondary 88.

During the first 90° of a cycle, the voltage at first phase terminal 90 is increasing toward its positive peak, while the voltage at second phase terminal 92 is increasing in magnitude toward its negative peak value. During the first 90° of the cycle, first capacitor 98 charges through first diode 96 as soon as the voltage from terminal 90 to terminal 92 exceeds the forward bias voltage drop of diode 96. In other words, first capacitor 98 charges throughout almost the entire 90° to a voltage which is equal to the peak voltage between first phase terminal 90 and second phase terminal 92, less the forward bias voltage drop across first diode 96.

During the first 90° of the cycle, second capacitor 102 is discharging through diode 110 to positive output terminal 104 because first phase terminal 90 (and therefore the negative terminal of second capacitor 102) is rising in potential. Diode 100 is reverse biased during the first 90°, so that no charging current is flowing to the positive terminal of capacitor 102. At the end of the 90°, second capacitor 102 is fully discharged, while first capacitor 98 is fully charged.

From 90° to 180° of the cycle, first capacitor 98 no longer receives charging current through diode 96 because the voltage across first capacitor 98 now exceeds the voltage between terminals 90 and 92, and first diode 96 is reverse biased. During this portion of the cycle, the potential at second phase terminal 92 (and therefore the negative terminal of first capacitor 98) has passed its negative peak and is rising toward zero. First capacitor 98, therefore, discharges through third diode 108 to positive terminal 104 and through the load (not shown) connected between terminals 104 and 106 and back to center tap terminal 94, through a portion of secondary 88 to second phase terminal 92 and the negative terminal of first capacitor 98. First capacitor 98 continues to discharge throughout the portion of the cycle from 90° to 180°, while the voltage difference between first and second phase terminals 90 and 92 decreases to zero, with the potential at first phase terminal 90 falling while the potential at second phase terminal 92 is rising.

From 180° to 270° of the cycle, first capacitor 98 still cannot receive further charging current through first diode 96 because the potential of the positive terminal of first capacitor 98 is greater than the potential (now negative) at first phase terminal 90 and first diode 96 remains reverse biased. First capacitor 98 continues to discharge through third diode 108 to positive terminal 104 because the potential of second phase terminal 92 is still rising. By 270° the potential at second phase terminal 92 reaches its positive peak, and capacitor 98 is fully discharged.

During the portion of the cycle from 180° to 270°, the potential at second phase terminal 92 is positive and increasing with respect to center tap 94, while the potential at first phase terminal 90 is going from zero to its negative peak with respect to center tap terminal 94. In other words, the polarity of the voltage between first and second phase terminal 90 and 92 is exactly opposite to the polarity which appeared during the portion of the cycle from 0° to 90°. As a result, second capacitor 102 is charged through second diode 100 during essentially all of the portion of the cycle between 180° and 270°. As soon as the positive potential from terminal 92 to terminal 90 exceeds the potential at the positive terminal of second capacitor 102 by the forward bias voltage drop of second diode 100, conduction of charging current to the positive terminal of capacitor 102 begins and continues throughout essentially the entire period until 270°. It should be noted that the voltage across second capacitor 102 is essentially zero at the beginning of this portion of the cycle, since second capacitor 102 had been fully discharged. Charging of second capacitor 102, therefore, occurs for nearly 90° of the cycle.

At 270°, first capacitor 98 is fully discharged and second capacitor 102 is fully charged. As the potential at second phase terminal 92 begins to decrease from its peak positive value, second diode 100 becomes reverse biased and current flow to second capacitor 102 halts. Since the potential at first phase terminal 90 (and therefore the negative terminal of second capacitor 102) has passed its negative peak and is rising, second capacitor 102 begins discharging through fourth diode 110 to positive terminal 104. This discharge of second capacitor 102 continues throughout the remainder of the cycle and throughout the first 90° of the next cycle until the potential at first phase terminal 90 reaches its positive peak and second capacitor 102 is fully discharged.

During the portion of the cycle from 270° to 360°, first diode 96 is reverse biased, and no charging current flows to first capacitor 98. Similarly, third diode 108 is reverse biased, so that current flowing from second capacitor 102 is supplied to positive output terminal 104, and is not permitted to reach first capacitor 98.

If no load (i.e. open circuit) is present, or a minimum load current is present across the output terminals 104 and 106, the voltage appearing across terminals 104 and 106 is three times the peak value across terminals 90 and 92, less the forward bias voltage drops of first and third diodes 96 and 108 or second and fourth diodes 100 and 110. This output voltage under no load or minimum load conditions appears as a series of half waves. At maximum load (i.e. at maximum load current being drawn from output terminals 104 and 106), the output voltage appearing across terminal 104 and 106 is the peak value of voltage from center tap terminal 94 to either first phase terminal 90 or second phase terminal 92 minus two diode forward bias voltage drops. The output voltage is essentially level at that full load. This is the converse of conventional power supplies like those shown in FIGS. 1 and 2, in which the ripple voltage is a maximum at full load and a minimum at no load. In the basic split bridge power supply shown in FIG. 3, the output voltage has its higher ripple value at minimum load and has its minimum ripple value at full load. If the maximum load is exceeded, a ripple pattern again appears. This, however, is of less concern, since the maximum load condition is the maximum load current at which the output voltage remains within a regulated value.

The split bridge power supply shown in FIG. 3 achieves smaller capacitor values than have been possible in the prior art because first and second capacitors 98 and 102 are charging to the full peak-to-peak value between first and second phase terminals 90 and 92, less two forward bias diode voltage drops and are discharging that same voltage value. Since capacitance value $C = it/dV$, the larger the value of $dV$, the smaller the value of the capacitors. The capacitance value is inversely proportional to the differential voltage appearing across the capacitor during each cycle. The power supply of FIG. 3 maximizes the possible value of $dV$ by essentially fully charging and discharging first and second capacitors 98 and 102 during each cycle.

The power supply of FIG. 3 also yields lower transformer requirements. In the split bridge power supply of FIG. 3, first diode 96 conducts and supplies charging current to first capacitor 98 during essentially 90° of each cycle. Similarly, second diode 100 permits charging current to flow to second capacitor 102 during essentially 90° of each cycle. Since current is permitted to flow for a substantially longer period than in conventional power supplies, the large surge currents required in conventional power supplies are not encountered. As a result, the transformer wire diameters can be reduced, the cross-sectional area of the transformer windings can be reduced, and the mass of the transformer core can be reduced. In the present invention, the charging time for the capacitors is spread over a longer time period so that large surge currents, which necessitate larger transformers, are significantly reduced.

From FIG. 3 it can be seen that first diode 96 provides a first charging circuit for first capacitor 98, while second diode 100 provides a charging circuit for second capacitor 102. In both cases, the charging current permitted by first and second diodes 96 and 100 is unidirectional current and occurs during a portion of each cycle so that first and second capacitors 98 and 102 are fully charged during first and second portions, respectively, of each cycle. Third and fourth diodes 108 and 110 provide discharge circuits for first and second capacitors 98 and 102, respectively. Third and fourth diodes 108 and 110 connect first and second capacitors 98 and 102 to a common positive output terminal 104 while electrically isolating the capacitors from one another, so that the charge from one capacitor is not transferred to the other capacitor. First capacitor 98 discharges during a third portion of each cycle, and second capacitor 102 discharges during a fourth portion of each cycle. In the embodiments shown in FIG. 3, the first and second portions of the cycle, during which capacitors 98 and 102, respectively, are charging, last approximately 90° each, while the third and fourth portions of the cycle are approximately 180° each. As a result, the first portion of the cycle during which first capacitor 98 is charging occurs during the latter half of the fourth portion of the cycle during which second capacitor 102 is discharging. Similarly, the second portion of the cycle during which second capacitor 102 is charging occurs during the latter half of the third portion of the cycle during which first capacitor 98 is discharging. Each capacitor is charged and begins discharging when the other capacitor has been fully discharged. One of the two capacitors is discharging at essentially all times during the cycle.

Figure 4:
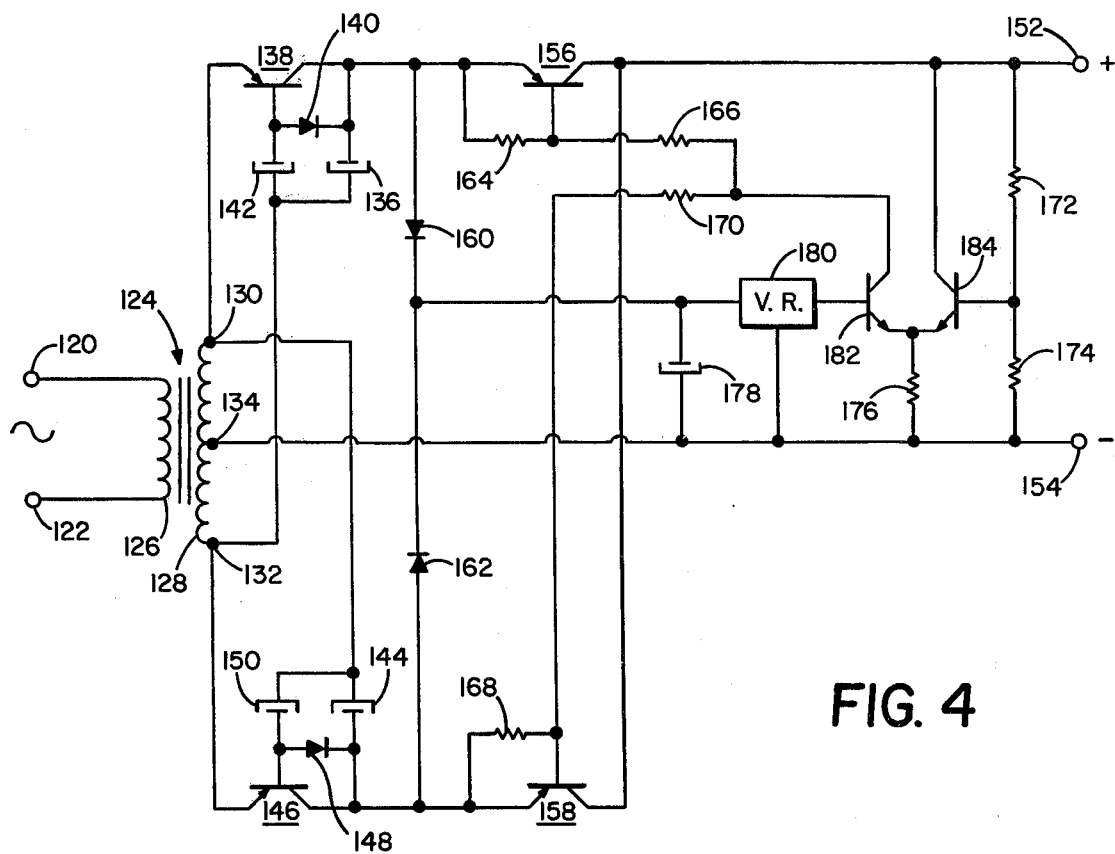

The Transistorized Split Bridge Power Supply of FIG. 4

FIG. 4 shows another embodiment of the power supply of the present invention. The power supply of FIG. 4 is a transistorized split bridge circuit, and also includes a voltage regulator circuit which regulates the output voltage. The transistorized split bridge of FIG. 4 exhibits lower losses than the split bridge using diodes which is shown in FIG. 3. The lower losses are encountered because high current transistors (e.g. 2N408) exhibit saturation voltages substantially lower than the forward voltage of high current diodes. This is particularly important in high load current power supplies, in which heat losses and dissipation of heat can become a significant problem.

The power supply of FIG. 4 includes input terminals 120 and 122, which receive input AC line voltage. Transformer 124 has its primary 126 connected to input terminals 120 and 122.

Secondary 128 of transformer 124 has three terminals: first phase terminal 130, second phase terminal 132, and center tap terminal 134. Connected between terminals 130 and 132 are first main capacitor 136 and a first charging circuit including PNP transistor 138, diode 140, and base current storage capacitor 142. Transistor 138 has its emitter connected to first phase terminal 130, and its collector connected to the positive terminal of first main capacitor 136. The base of transistor 138 is connected to the positive terminal of base current storage capacitor 142. Both first main capacitor 136 and base current storage capacitor 142 have their negative terminals connected to second phase terminal 132. Diode 140 has its anode connected to the positive terminal of base current storage capacitor 142 and its cathode connected to the positive terminal of first main capacitor 136.

Also connected between terminals 130 and 132 are second main capacitor 144 and a second charging circuit including PNP transistor 146, diode 148, and base current storage capacitor 150. Transistor 146 has its emitter connected to second phase terminal 132, its collector connected to the positive terminal of second main capacitor 144, and its base connected to the positive terminal of base current storage capacitor 150. The negative terminals of capacitors 144 and 150 are connected to first phase terminal 130. Diode 148 has its anode connected to the positive terminal of base current storage capacitor 150 and its cathode connected to the positive terminal of second main capacitor 144.

The remaining circuitry shown in FIG. 4 is discharging circuitry which provides discharge paths for first and second main capacitors 136 and 144 and which regulates the output voltage appearing across output terminals 152 and 154. Transistors 156 and 158 regulate the flow of discharge current from capacitors 136 and 144, respectively, to positive output terminal 152. In addition, transistors 156 and 158 provide isolation of first and second main capacitors 136 and 144 so that charge is not transferred back and forth between the two capacitors during the discharging portions of each cycle. Instead, the discharge current is supplied solely to positive output terminal 152.

Transistors 156 and 158 are both PNP transistors which have their emitters connected to the positive terminals of first and second main capacitors 136 and 144, respectively. The collectors of transistors 156 and 158 are tied together and are connected to positive output terminal 152. Negative output terminal 154 is connected directly to center tap terminal 134 of secondary 128.

Current flow through transistors 156 and 158 is controlled by regulator circuitry including the diodes 160 and 162, resistors 164, 166, 168, 170, 172, 174, and 176, capacitor 178, voltage regulator 180, and NPN transistors 182 and 184.

Resistor 164 is connected between the emitter and base of transistor 156, and resistor 166 is connected between the base of transistor 156 and the collector of transistor 182. Similarly, resistor 168 is connected between the emitter and base of transistor 158, and resistor 170 is connected between the base of transistor 158 and the collector of transistor 182.

Diodes 160 and 162 have their anodes connected to the positive terminals of capacitors 136 and 144, respectively. The cathodes of diodes 160 and 162 are connected together and to the input of voltage regulator 180, which is preferably an LM78L05 type of low current regulator. Capacitor 178 is connected between the input terminal of voltage regulator 180 and output terminal 154. The output of voltage regulator 180 is connected to the base of transistor 182 so that a constant reference voltage is supplied to the base of transistor 182.

Transistor 184 has its collector connected to positive output terminal 152, and its emitter is connected to the emitter of transistor 182. Resistor 176 is connected between the emitters of transistors 182 and 184 and negative output terminal 154. The base of transistor 184 is connected to the junction of resistors 172 and 174, which form a voltage divider connected between output terminals 152 and 154.

In operation, during the first 90° of the cycle, capacitors 136 and 142 charge to a voltage essentially equal to the peak voltage between terminals 130 and 132. First main capacitor 136 charges through the emitter-collector current path of transistor 138, while base current storage capacitor 142 charges from base current supplied through the base-emitter junction of transistor 138.

During the first 90° of the cycle, second main capacitor 144 is discharging through transistor 158 to positive terminal 152. In addition, base current storage capacitor 150 is discharging through diode 148, which is forward biased so long as the voltage across capacitor 150 exceeds the voltage across second main capacitor 144.

In a preferred embodiment, base current storage capacitor 142 is smaller than first main capacitor 136 by a ratio determined by the gain of transistor 138. If, for example, the gain of transistor 138 is ten, then base current storage capacitor 142 has a capacitance which is one-tenth of the capacitance of first main capacitor 136.

The purpose of base current storage capacitor 142 is to store the base current supplied during the charging of first main capacitor 136. Although a resistor could be used to connect the base of transistor 138 to second phase terminal 132, the base current would then be lost in the form of heat losses. Instead, by storing charge in base current storage capacitor 142, this charge can be subsequently used when capacitor 136 is discharged, thereby reducing the effective losses of the power supply. Diode 140 serves to isolate capacitor 142 from capacitor 136 during the charging portion of the cycle. At the end of the first 90° of the cycle, capacitors 136 and 142 are essentially fully charged, and capacitors 144 and 150 are essentially fully discharged. At this point in the cycle, the potential at first phase terminal 130 begins to decrease from its peak positive value, and the potential at second phase terminal 132 begins to rise from its peak negative value. As a result, transistor 138 turns off, since the base emitter junction is reverse biased. The rise in potential at second phase terminal 132 causes first main capacitor 138 to discharge through transistor 156 to output terminal 152. As first main capacitor 136 discharges, its potential decreases to a value below the potential at the positive terminal of base current storage capacitor 142, and diode 140 is forward biased. At that point, base current storage capacitor 142 begins to discharge to the positive terminal of first main capacitor 136.

At maximum load conditions, the discharging of capacitors 136 and 142 continues as long as the potential of second phase terminal 132 (and therefore their negative terminals) is rising. In other words, the discharging continues essentially from 90° to 270° of the cycle. By the 270° point, capacitors 136 and 142 are essentially fully discharged.

During the portion of the cycle from 90° to 180°, capacitors 144 and 150 remain discharged, since the potential of second phase terminal 132 is negative with respect to first phase terminal 130, and the base emitter junction of transistor 146 is reverse biased.

At 180°, the polarities of first and second phase terminals 130 and 132 reverse and the voltage at second phase terminal 132 is positive with respect to center tap terminal 134 and first phase terminal 130. As a result, transistor 146 turns on and second main capacitor 144 begins to charge. At the same time, base current storage capacitor 150 charges from the base current drawn through transistor 146. Capacitors 144 and 150 charge to the voltage difference between the peak positive potential of second phase terminal 132 and the peak negative potential of first phase terminal 130, less the saturation voltage drop between emitter and collector of transistor 146.

At 270°, the potential of second phase terminal 132 has reached its peak positive value and begins to decrease, while the potential of first phase terminal 130 is at its peak negative value and begins to rise. As a result, the base-emitter junction of transistor 146 is reverse biased and transistor 146 turns off. As the potential at first phase terminal 130 (and therefore the potential at the negative terminals of capacitors 144 and 150) rises, second main capacitor 144 begins to discharge through the transistor 158 emitter-collector current path to positive terminal 152. As soon as capacitor 144 is discharged to a voltage which is less than the voltage across base current storage capacitor 150 by one forward bias voltage drop of diode 148, capacitor 150 begins to discharge through diode 148. The discharging of capacitors 144 and 150 continues so long as the potential of first phase terminal 130 is rising, which occurs throughout the remainder of the cycle and through the first 90° of the following cycle.

During the final 90° of the cycle, capacitors 136 and 142 are fully discharged and remain in that state. Transistor 138 is turned off, since the base-emitter junction 138 is reverse biased. Transistor 138 once again begins to turn on and capacitors 136 and 142 begin to charge during the first 90° of the next cycle.

Thus far in the discussion, it has been assumed that transistors 156 and 158 remain on throughout the entire discharging of the capacitors. The remaining circuitry shown in FIG. 4, however, controls transistors 156 and 158 so that the voltage across terminals 152 and 154 remains constant to within a desired limit. As a result, during portions of each cycle, transistors 156 and 158 may be partially or entirely turned off.

Diodes 160 and 162 bleed off a small amount of current to supply voltage regulator 180. Capacitor 178 receives the current which was supplied by diodes 160 and 162, and supplies an input voltage at the input terminal of voltage regulator 180. The output of voltage regulator 180 is connected to the base of transistor 182, and provides a constant reference voltage between the base of transistor 182 and negative output terminal 154.

The state of conduction of transistor 182 between its collector and emitter controls the amount of current flow through resistors 164 and 166 and also through resistors 168 and 170. The amount of current flowing through resistor 164 determines the base-emitter voltage of transistor 156, and similarly the current flowing through resistor 168 determines the base-emitter voltage of transistor 158. As a result, the conduction of transistors 156 and 158 is controlled by the conduction of transistor 182.

The voltage divider formed by resistors 172 and 174 provide a variable voltage at the base of transistor 184. This voltage, of course, is a ratio of the output voltage across terminals 152 and 154. Transistors 182 and 184 effectively compare the reference voltage supplied to the base of transistor 182 with the divided output voltage at the base of transistor 184. If the voltage at the base of transistor 184 exceeds the reference voltage at the base of transistor 182, transistor 184 turns on more heavily, thereby taking current away from transistor 182. As a result, the current flowing through resistors 164 and 166 and the current flowing through resistors 168 and 170 decreases. This depletes the current to the base of transistors 156 and 158 and thereby reduces the current flow through transistors 156 and 158 to positive terminal 152. With less current the output voltage begins to decrease and the voltage at the base of transistor 184 decreases until transistor 184 turns off sufficiently to allow transistor 182 to turn on to stabilize the output voltage.

In one preferred embodiment of the power supply of FIG. 4, the transistors are germanium transistors which have extremely low saturation voltages. As a result, the losses due to the saturation voltage are considerably less than the losses created by diode forward bias voltages. In addition, the use of transistors rather than diodes as part of the discharging circuitry permits regulation of current flow, and therefore regulation of output voltage.

Figure 5:
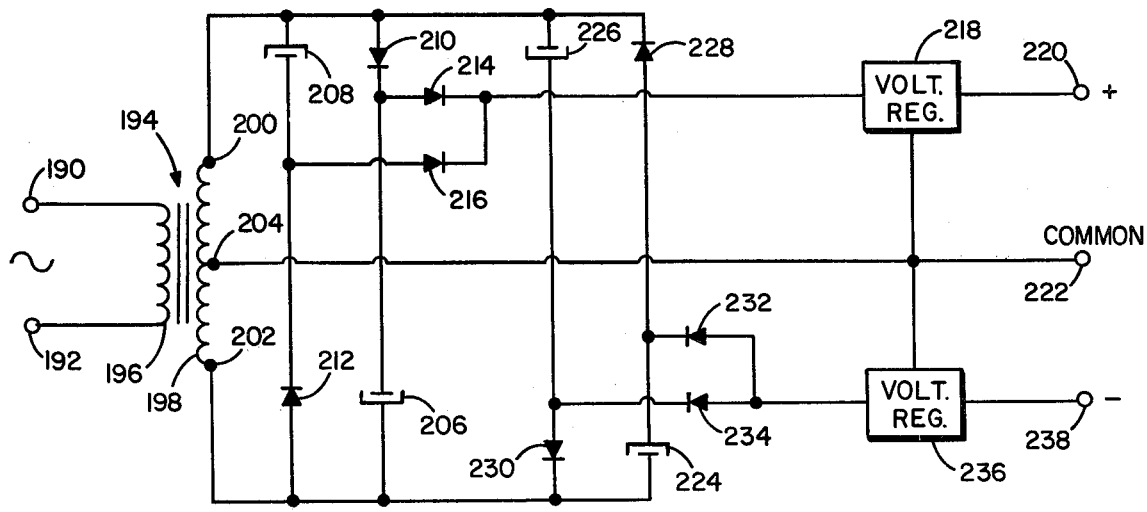

The Dual Output Split Bridge Power Supply of FIG. 5

Although FIGS. 3 and 4 have shown power supplies which provide a single output voltage of one polarity, the present invention is also well suited to power supplies which provide both a positive and a negative DC output voltage. FIG. 5 is an example of a diode split bridge power supply which provides both positive and negative DC output voltages.

The power supply of FIG. 5 includes input terminals 190 and 192, which receive input AC line voltage. Transformer 194 has its primary 196 connected to input terminals 190 and 192. Secondary 198 has three terminals: first phase terminal 200, second phase terminal 202, and center tap terminal 204. The positive output voltage portion of the power supply includes first and second capacitors 206 and 208, first and second charging diodes 210 and 212, first and second discharging diodes 214 and 216, and voltage regulator 218. The positive output portion of the power supply is similar to the basic diode split bridge shown in FIG. 3. First capacitor 206 has its negative terminal connected to second phase terminal 202 and its positive terminal connected to the cathode of diode 210 and the anode of diode 214. The anode of first charging diode 210 is connected to the first phase terminal 200.

Second capacitor 208 has its negative terminal connected to first phase terminal 200, and its positive terminal connected to the cathode of first charging diode 212 and the anode of second discharging diode 216. The anode of second charging diode 212 is connected to second phase terminal 202.

The cathodes of first and second discharging diodes 214 and 216 are connected together and are supplied to the input terminal of voltage regulator circuit 218. Voltage regulator circuit 218 may take any one of a variety of well-known forms, and is provided to regulate the positive output voltage appearing between positive output terminal 220 and common output terminal 222, which is connected to center tap terminal 204.

The operation of the positive power supply portion of the power supply of FIG. 5 is identical to the operation of the basic diode split bridge circuit shown in FIG. 3. It will not, therefore, be discussed in detail again.

The negative portion of the power supply is similar to the positive power supply, except that the polarities of the diodes and capacitors are reversed. The negative power supply includes third and fourth capacitors 224 and 226, third and fourth charging diodes 228 and 230, third and fourth discharging diodes 232 and 234, and voltage regulator circuit 236.

As shown in FIG. 5, third capacitor 224 has its positive terminal connected to second phase terminal 204 and its negative terminal connected to the anode of third charging diode 228 and the cathode of third discharging diode 234. The cathode of third charging diode 228 is connected to first phase terminal 220. The anode of third discharging diode 232 is connected to an input terminal of voltage regulator 236. Similarly, fourth capacitor 226 has its positive terminal connected to first phase terminal 200 and its negative terminal connected to the anode of fourth charging diode 230 and the cathode of fourth discharging diode 234. The cathode of fourth charging diode 230 is connected to second phase terminal 202, and the anode of fourth discharging diode 234 is connected to the input of voltage regulator 236.

The output voltage from the negative portion of the power supply produces a DC output voltage between negative terminal 238 and common terminal 222. The output of voltage regulator 236 is connected to negative output terminal 238.

The operation of the negative portion of the power supply is the same as the operation of the positive portion of power supply, except that all polarities are reversed. It can be seen, therefore, that the present invention can be used to produce either a positive power supply output, negative power supply output, or both positive and negative outputs in the same power supply.

As with the previously discussed embodiments, the split bridge power supply shown in FIG. 5 significantly reduces capacitance requirements over prior art power supplies, and also significantly reduces transformer requirements.

Figure 6:
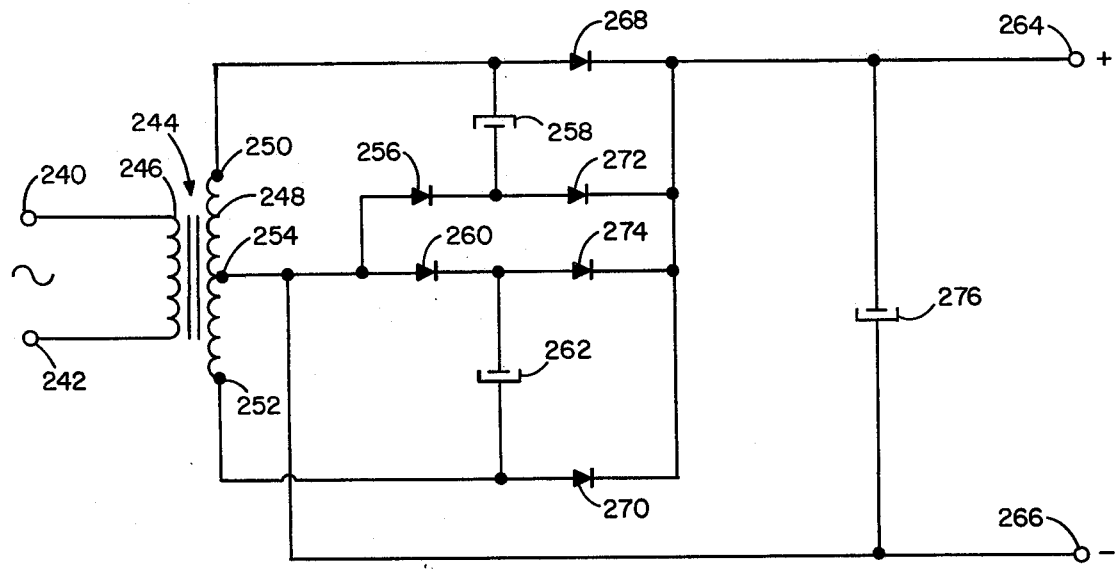

The Phase Shifting Bridge Power Supply of FIG. 6

FIG. 6 shows another embodiment of the present invention, which may be termed a "phase shifting bridge" power supply. As in the previous embodiments of the present invention, the power supply of FIG. 6 substantially reduces capacitance and transformer requirements by fully charging and discharging capacitors during each cycle.

The power supply of FIG. 6 includes input terminals 240 and 242, which receive input AC line voltage. Transformer 244 has its primary 246 connected to input terminals 240 and 242. Secondary 248 of transformer 244 has first phase terminal 250, second phase terminal 252, and center tap terminal 254.

Connected between center tap terminal 254 and first phase terminal 250 are diode 256 and capacitor 258. Diode 256 has its anode connected to center tap terminal 254 and its cathode connected to the positive terminal of capacitor 258. The negative terminal of capacitor 258 is connected to first phase terminal 250.

Similarly, diode 260 and capacitor 262 are connected between center tap terminal 254 and second phase terminal 252. The anode of diode 260 is connected to center tap terminal 254 and the cathode of diode 260 is connected to the positive terminal of capacitor 262. The negative terminal in capacitor 262 is connected to second phase terminal 252.

The DC output voltage of the power supply appears between positive output terminal 264 and negative output terminal 266, which is connected to center tap terminal 254. Diodes 268 and 270 have their anodes connected to the first and second phase terminals 252 and 254, respectively, and have their cathodes connected to positive output terminal 264. In addition, diode 272 has its anode connected to the positive terminal of capacitor 258 and its cathode connected to positive output terminal 264. Diode 274 has its anode connected to the positive terminal of capacitor 262 and its cathode connected to positive output terminal 264. It can be seen, therefore, that current is supplied to positive output terminal 264 through four separate diodes 268, 270, 272 and 274.

Filter capacitor 276 is connected between output terminals 264 and 266 and acts as the main filter capacitor of the power supply. Filter capacitor 276 has its positive terminal connected to positive output terminal 264 and its negative terminal connected to negative output terminal 266.

The following description of operation assumes that capacitor 276 is not in the circuit and a maximum rated load is across the output terminals. The addition of capacitor 276 further reduces ripple, but its value is only one-half of the capacitance normally required in prior art power supplies.

During the first 90° of a cycle, first phase terminal 250 is positive and increasing to its positive peak with respect to center tap terminal 254. At the same time, the potential at second phase terminal 252 is going negative to its negative peak with respect to center tap terminal 254. As a result, diode 260 is forward biased and charging current flows from center tap terminal 254 to the positive terminal of capacitor 262. At the same time that capacitor 262 is charging, diode 268 is forward biased, and the phase one voltage is being fed directly through diode 268 to the positive terminal 262.

As the cycle passes 90°, capacitor 262 has its full charge, which is the voltage from center tap terminal 254 to second phase terminal 252, minus the forward bias voltage drop across diode 260. As the potential at terminal 252 passes its negative peak and begins to rise, the potential at the positive terminal of capacitor 262 rises until the potential at the positive terminal of capacitor 262 exceeds the potential at terminal 264 by the forward bias voltage drop of diode 274. At this point, diode 274 begins to conduct, and capacitor 262 begins to discharge through diode 274 to positive output terminal 264. Capacitor 262 begins discharging at approximately 150° of the cycle and continues to approximately 210°.

At 180°, the polarities at first and second phase terminals 250 and 252 reverse, and the potential at phase one terminal 250 begins to go negative toward its negative peak while the potential at second phase terminal 252 is positive and rising to its positive peak. When the potential at second phase terminal 252 exceeds the potential at positive output terminal 264, diode 270 is forward biased and supplies the phase two signal to output terminal 264.

During that portion of the cycle between 180° and 270°, first phase terminal 250 is negative with respect to center tap terminal 254 and is approaching its negative peak. During this portion of the cycle, charging current flows through diode 256 to the positive terminal of capacitor 258. By 270°, capacitor 258 is fully charged and, as the potential at terminal 250 passes its negative peak and begins to rise, the potential at the positive terminal of capacitor 258 continues to rise. At about 330°, the potential at the positive terminal of capacitor 258 exceeds the potential at output terminal 264 by the forward bias voltage drop of diode 272. At this point, capacitor 258 begins to discharge through diode 272 to positive output terminal 264. Capacitor 258 continues to discharge throughout the remainder of the cycle and through the first 30° of the following cycle.

The effect of capacitors 258 and 262, therefore, is to effect a phase shift for two legs of the current flowing into main filter capacitor 276. A portion of the current to main filter capacitor 276 is supplied directly by diodes 268 or 270, while the remainder of the current is supplied by discharging capacitors 258 or 262 through diodes 272 and 274, respectively. Capacitors 258 and 262 provide current during the time period when the voltage of the rectified secondary voltage through diodes 268 and 270 has decreased below a predetermined minimum value.

As in the previously discussed embodiments of the present invention, substantial reduction in capacitance is achieved by fully charging and discharging capacitors 258 and 262 during each cycle. Main filter capacitor 276 no longer has to maintain voltage for approximately 8 milliseconds between charging half cycles, as is the case in the prior art power supplies shown in FIG. 1 and FIG. 2. Instead, the main filter only has to maintain a voltage above a predetermined minimum for approximately 4 milliseconds or less. Since the capacitance of main filter capacitor 276 is equal to it/dV, the reduction in the value of t by 50% or more results in a substantial reduction in the capacitance of main capacitor 276 in comparison to the required capacitance of prior art filter capacitors. The two additional capacitors 258 and 262 fully charge and discharge during each cycle. The value of dV used to determine the capacitance of capacitors 258 and 262, therefore, is equal to the peak voltage from center tap to either terminal 250 or 252 less one forward bias voltage drop (of diode 256 or diode 260). Assuming that the values of i and t remain the same as those required for capacitor 276, both capacitor 258 and capacitor 262 will be only a small fraction of the capacitance of capacitor 276. For example, if the ripple voltage dV desired across capacitor 276 is one volt, and the peak voltage from center tap to either first or second phase terminals 250 or 252 is about 10 volts. The capacitance of each capacitor 258 and 262, therefore, is about one-tenth of the value of capacitor 276, since dV is about ten times larger. The total capacitance of the power supply is the sum of the capacitance of capacitors 258, 262, and 276. It can be seen that the sum of these three capacitances is still significantly less than the capacitance of a single filter capacitor used in one of the prior art power supplies.

Figure 7:
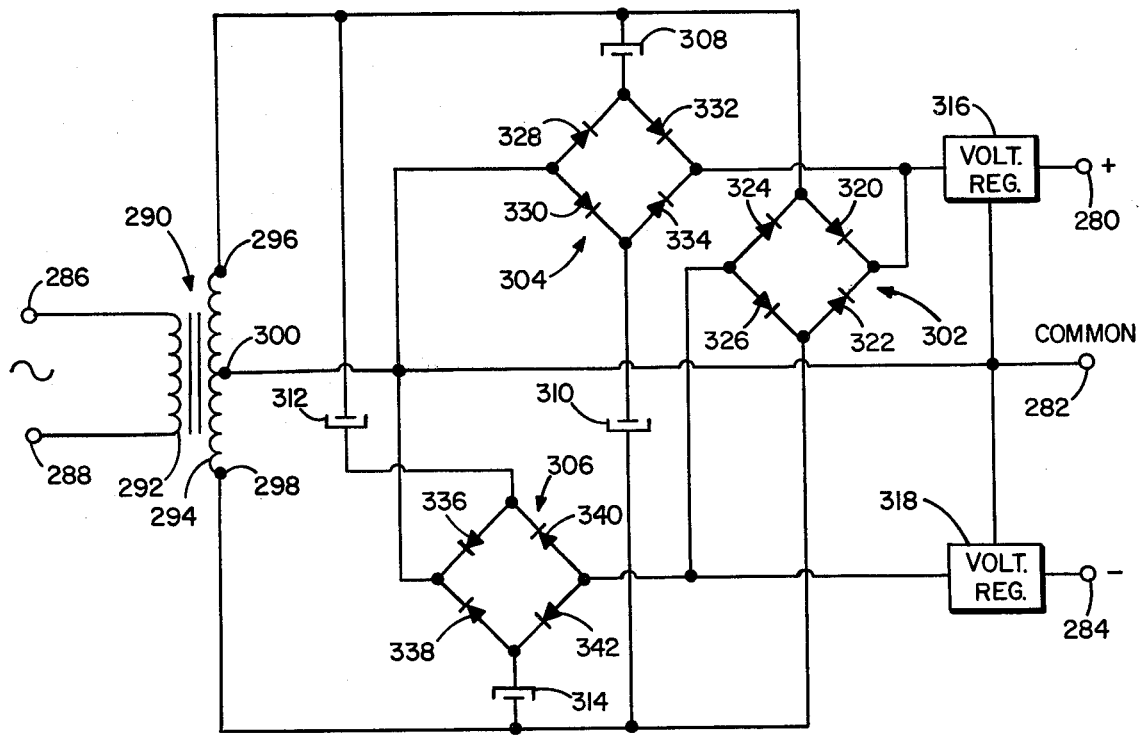

The Dual Output Phase Shifting Bridge Power Supply of FIG. 7

FIG. 7 shows another embodiment of the phase shifting bridge power supply of the present invention. The power supply of FIG. 7 provides both a positive output voltage between positive output terminal 280 and common terminal 282, and a negative output voltage between negative output terminal 284 and common terminal 282.

The power supply of FIG. 7 includes input terminals 286 and 288, which receive AC input line voltage. Transformer 290 has its primary 292 connected to input terminals 286 and 288. Secondary 294 of transformer 290 has three terminals: first phase terminal 296, second phase terminal 298, and center tap terminal 300.

The power supply of FIG. 7 also includes three diode bridges 302, 304, and 306, four capacitors 308, 310, 312, and 314, and voltage regulators 316 and 318. Diodes 320 and 322 of bridge 302 have their anodes connected to first and second phase terminals 296 and 298, respectively. Their cathodes are connected together to the input of voltage regulator 316. The output of voltage regulator 316 is connected to positive output terminal 280. Diodes 320 and 322 provide rectified half wave voltage from the first and second phase windings of secondary 294. Diodes 324 and 326 of diode bridge 302 perform a similar function supplying voltage of opposite polarity to voltage regulator 318, whose output terminal is connected to negative output terminal 284. Diodes 324 and 326 have their anodes connected together and to the input of voltage regulator 318. The cathode of diode 324 is connected to first phase terminal 296, while the cathode of diode 326 is connected to second phase terminal 298.

The positive voltage supply includes diode bridge 304 and capacitors 308 and 310, diodes 320 and 322 of bridge 302, and voltage regulator 316. Diodes 328 and 330 of bridge 304 have their anodes connected to center tap terminal 300 and have their cathodes connected to the positive terminals of capacitors 308 and 310, respectively. Diodes 328 and 330 provide charging currents to capacitors 308 and 310 during different portions of each cycle.

The discharging of capacitors 308 and 310 is achieved through diodes 332 and 334, respectively, of bridge 304. The anodes of diodes 332 and 334 are connected to the positive terminals of capacitors 308 and 310, respectively. The cathodes of diodes 332 and 334 are connected to the input of voltage regulator 316. The negative terminals of capacitors 308 and 310 are connected to first and second phase terminals 296 and 298, respectively.

The operation of the positive power supply is identical to the operation described with reference to FIG. 6. For that reason, a detailed description of operation will not be repeated.

The negative power supply, which includes capacitors 312 and 314, diode bridge 306, and diodes 324 and 326 of bridge 302, operates in an identical manner to the positive power supply, except that all components have opposite polarity. Capacitors 312 and 314 have their positive terminals connected to first and second phase terminals 296 and 298, respectively. The negative terminal of capacitor 312 is connected to the anode of diode 336, while the negative terminal of capacitor 314 is connected to the anode of diode 338. The cathodes of diodes 336 and 338 are connected together and to center tap terminal 300. Diodes 340 and 342 of bridge 306 have their cathodes connected to the negative terminals of capacitors 312 and 314, respectively. The anodes of diodes 340 and 342 are connected to the input of voltage regulator 318.

As in the case of the other power supplies, the power supply of FIG. 7 achieves significantly lower capacitance than is possible with other prior art linear power supplies which supply comparable output voltages and load currents. This is achieved by fully charging and discharging capacitors 308, 310, 312 and 314 during each cycle. As a result, the differential voltage dV across each capacitor is essentially the peak voltage from center tap terminal 300 to either the first phase terminal 296 or second phase terminal 298. Since capacitance is inversely proportional to differential voltage dV, substantially lower capacitance values are required than in conventional power supplies like those shown in FIGS. 1 and 2, where the voltage ripple across the filter capacitance must be rather small.

In conclusion, the power supply of the present invention provides substantially lower capacitance requirements and lower transformer requirements than prior art power supplies. The substantial reduction in capacitance and transformer cost and size yields a smaller, lower cost, and more efficient power supply than presently available linear power supplies.

Although the present invention has been described with reference to preferred embodiments, workers skilled in the art will recognize that changes may be made in form and detail without departing from the spirit and scope of the invention.

What is claimed is:

1. A power supply for providing a DC output voltage, the power supply comprising:
    first and second input terminals adapted to be connected to a source of AC input power;
    first and second output terminals for supplying a DC output voltage;
    transformer means having a primary and a secondary, the primary being connected to the first and second input terminals and the secondary having first and second phase terminals and having a center tap terminal connected to the second output terminal;
    first capacitor means;
    second capacitor means;
    first charging circuit means connected to the secondary for charging the first capacitor means during a first portion of each cycle;
    second charging circuit means connected to the secondary for charging the second capacitor means during a second portion of each cycle;

first discharging circuit means for connecting the first capacitor means to the first output terminal and permitting the first capacitor means to discharge during a third portion of each cycle; and second discharging circuit means for connecting the second capacitor means to the first output terminal and permitting the second capacitor means to discharge during a fourth portion of each cycle.

2. The power supply of claim 1 wherein the first portion of each cycle occurs during the fourth portion of each cycle and wherein the second portion of each cycle occurs during the third portion of each cycle.

3. The power supply of claim 1 wherein the first capacitor means has first and second terminals, the first terminal being connected to the first charging circuit means and the first discharging circuit means and the second terminal of the first capacitor means being connected to the second phase terminal of the secondary; and wherein the second capacitor has first and second terminals, the first terminal of the second capacitor means being connected to the second charging circuit means and the second discharging circuit means; and the second terminal of the second capacitor means being connected to the first phase terminal of the secondary.

4. The power supply of claim 3 wherein the first charging circuit means is connected between the first phase terminal and the first terminal of the first capacitor means and permits a unidirectional charging current to flow to the first capacitor means during the first portion of each cycle; and wherein the second charging circuit means is connected between the second phase terminal of the secondary and the first terminal of the second capacitor means and permits a unidirectional charging current to flow to the second capacitor means during the second portion of each cycle.

5. The power supply of claim 4 wherein the first discharging circuit means is connected between the first terminal of the first capacitor means and the first output terminal and permits unidirectional discharge current flow from the first capacitor means during the third portion of each cycle; and wherein the second discharging circuit means is connected between the first terminal of the second capacitor means and the first output terminal and permits a unidirectional discharge current to flow from the second capacitor means during the fourth portion of each cycle.

6. The power supply of claim 5 wherein the first and second charging circuit means comprise first and second rectification means, respectively, and wherein the first and second discharging circuit means comprise third and fourth rectification means, respectively.

7. The power supply of claim 5 wherein the first charging circuit means comprises first transistor means having an emitter-collector current path connected between the first phase terminal and the first terminal of the first capacitor means; and wherein the second charging circuit means comprises second transistor means having an emitter-collector current path connected between the second phase terminal and the first terminal of the second capacitor means.

8. The power supply of claim 7 wherein the first charging circuit means further comprises first base current storage capacitor means connected between a base of the first transistor means and the second phase terminal; and wherein the second charging circuit means further comprises second base current storage capacitor means connected between a base of the second transistor means and the first phase terminal.

9. The power supply of claim 8 wherein the first charging means further comprises first diode means connected between the first base current storage capacitor means and the first capacitor means; and wherein the second charging means further comprises second diode means connected between the second base current storage capacitor means and the second capacitor means.

10. The power supply of claim 1 wherein the first discharging circuit means comprises first current regulating means for controlling current flow between the first output terminal and the first terminal of the first capacitor means; and wherein the second discharging circuit means comprises second current regulating means for controlling current flow between the first output terminal and the first terminal of the second capacitor means.

11. The power supply of claim 10 wherein the first and second current regulating means control current flow as a function of the DC output voltage.

12. The power supply of claim 11 wherein the first and second current regulating means comprise first and second transistor means having base electrodes connected to a circuit which provides control signals as a function of the DC output voltage and having emitter-collector current paths connected between the first output terminal and the first terminals of the first and second capacitor means, respectively.

13. The power supply of claim 1 wherein the first capacitor means and the first charging means are connected between the first phase terminal and the center tap terminal, and wherein the second capacitor means and the second charging means are connected between the second phase terminal and the center tap terminal.

14. The power supply of claim 13 and further comprising first and second rectification means connected between the first output terminal and the first and second phase terminals, respectively.

15. The power supply of claim 14 wherein the first capacitor means has first and second terminals, the first terminal of the first capacitor means being connected to the first charging circuit means and the second terminal of the first capacitor means being connected to the first phase terminal; and wherein the second capacitor means has first and second terminals, the first terminal of the second capacitor means being connected to the second charging circuit means and the second terminal of the second capacitor means being connected to the second phase terminal.

16. The power supply of claim 15 wherein the first and second charging circuit means comprise third and fourth rectification means connected between the center tap terminal and the first terminals of the first and second capacitor means, respectively.

17. The power supply of claim 16 wherein the first and second discharging circuit means comprise fifth and sixth rectification means connected between the first output terminal and the first terminals of the first and second capacitor means, respectively.

18. The power supply of claim 17 wherein the first, second, third, fourth, fifth, and sixth rectification means comprise first, second, third, fourth, fifth, and sixth diodes, respectively.

19. A power supply for providing a DC output voltage, the power supply comprising:

first and second input terminals adapted to be connected to a source of AC input power;
first and second output terminals for supplying a DC output voltage;
transformer means having a primary and a secondary, the primary being connected to the first and second input terminals and the secondary having first and second phase terminals and having a center tap terminal connected to the second output terminal;
first capacitor means and first rectification means connected between two of the terminals of the secondary for receiving a first AC signal from the secondary;
second capacitor means and second rectification means connected between two of the terminals of the secondary for receiving a second AC signal of opposite polarity from the secondary;
first discharging circuit means connecting the first capacitor means to the first output terminal; and
second discharging circuit means connecting the second capacitor means to the first output terminal.

20. The power supply of claim 19 wherein the first capacitor means and first rectification means are connected between the first and second phase terminals and wherein the second capacitor means and second rectification means are also connected between the first and second phase terminals in an opposite manner.

21. The power supply of claim 20 wherein the first and second rectification means comprise first and second diodes.

22. The power supply of claim 20 wherein the first and second rectification means comprise first and second transistor means.

23. The power supply of claim 19 wherein the first capacitor means and first rectification means are connected between the first phase terminal and the center tap terminal, and wherein the second capacitor means and second rectification means are connected between the second phase terminal and the center tap terminal.

24. The power supply of claim 23 and further comprising third and fourth rectification means connected between the first output terminal and the first and second phase terminals, respectively.

* * * * *